May 21, 1957     H. GIBSON     2,792,712
CONTROL FOR A VARIABLE PITCH PULLEY
Filed July 18, 1952     2 Sheets-Sheet 1

INVENTOR.
Harry Gibson
BY
Stiee & Stiee
Attys.

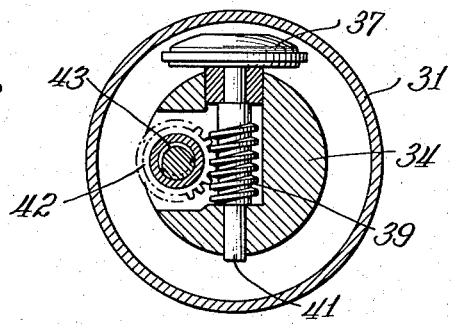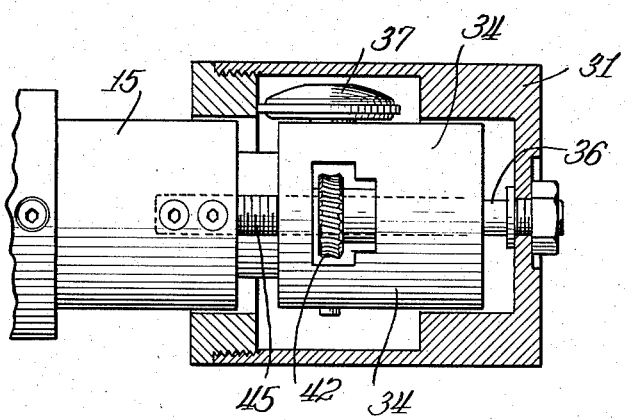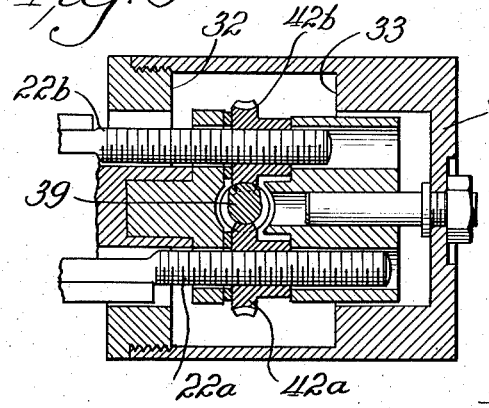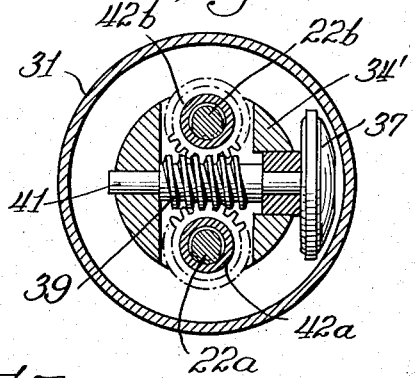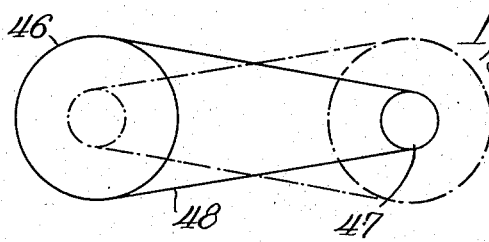

United States Patent Office 2,792,712
Patented May 21, 1957

2,792,712

CONTROL FOR A VARIABLE PITCH PULLEY

Harry Gibson, Los Angeles, Calif., assignor to Gerbing Manufacturing Corporation, Northbrook, Ill., a corporation of Illinois Application July 18, 1952, Serial No. 299,577

11 Claims. (Cl. 74—230.17)

The present invention relates to a novel means for effecting relative axial movement between a rotatable shaft and a sleeve slidably supported on the shaft.

More particularly, the invention relates to an improved variable pitch pulley mechanism having a novel control device for controlling pitch diameter changing movements of the pulley halves comprising a part thereof.

At the present time, one of the most widely used industrial methods of effecting speed control from a constant speed power source comprises coupling a shaft to be driven to the drive shaft of a power source through a variable pitch pulley and belt drive therefor. In such arrangements the speed of the driven shaft is varied by changing the effective pitch diameter of the variable pitch pulley. While such an arrangement is suitable in many respects, it has not been entirely satisfactory due to the fact that known methods and apparatus for changing the effective pitch diameter of the pulley require the use of tiltable or slidable motor bases for increasing the pressure of the pulley belt against the pulley halves to force the same apart, the pulley halves being normally biased together by some means, such as a compression spring. Thus, the presently used means for effecting a change in the pitch diameter of the pulley require relatively expensive installations, and are inefficient in operation.

It is therefore one object of the present invention to provide a positive and easily operated means for controlling the relative axial displacement between a rotatable shaft and a sleeve slidably supported thereon.

Another object of the invention is to provide a control device for a variable pitch pulley which derives the power for effecting a change in the pitch diameter of the pulley, from the pulley shaft itself.

A further object of the invention is to provide a combination variable pitch pulley and control device therefor which is compact in design, relatively simple to construct, and is comparatively inexpensive to manufacture.

A still further object of the invention is to provide a control device for a variable pitch pulley that is capable of effecting substantial changes in the pitch diameter ratio of a single variable pitch pulley power transmission unit, and which does not have to be used in tandem arrangements.

A feature of the invention is the provision of a novel means for effecting relative axial displacement between a rotatable shaft and a sleeve slidably supported thereon by means of a surface disposed transversely to the axis of rotation of such shaft and sleeve and floatingly supported with respect thereto, and a roller element, the means also comprising mechanism for selectively braking and engaging the floatingly supported surface with the roller element to impart rotational movement thereto, and translating the rotational movement of the roller element into a straight line force for effecting relative axial displacement between the shaft and sleeve.

Another feature of the invention is the provision of a control device for effecting relative axial displacement between a rotatable shaft and a sleeve slidably supported thereon. The device comprises an inner member operatively connected to the rotatable shaft, an outer housing enclosing the inner member and floatingly supported with respect thereto. A roller element is journaled on the inner member, and is adapted to be selectively engaged by an inner surface of the housing which imparts rotational movement thereto. Gear means movably mounted on the member then translate the rotational move imparted to the roller element into a straight line force for effecting relative axial displacement between the rotatable shaft and a sleeve slidably supported thereon.

Another feature of the invention is the provision of a variable pitch pulley mechanism which comprises a rotatable shaft, and a pair of opposed pulley halves slidably supported on the shaft. Each of the pulley halves has a key member rigidly connected thereto, the key members being slidably positioned in keyways formed in the shaft, and having a plurality of teeth formed along the opposed surfaces. A pinion rotatably mounted on the shaft operatively connects the key members for transmitting axial movement in one direction of one pulley half to the remaining pulley half, thereby causing the same to move in the opposite direction, and a control device is operatively connected to the mechanism for controlling the movement of the pulley halves. The control device comprises an inner member operatively connected to the shaft, a roller element journaled on the inner member, an outer housing floatingly supported with respect to the inner member and enclosing the same. The outer housing has an inner surface adapted to engage the roller element to impart rotational movement thereto, and mechanical means are provided for transmitting the rotational movement of the roller element to the pulley halves for changing the effective pitch diameter thereof.

Other objects, features and many of the attendant advantages of this invention will be appreciated more readily as the same becomes understood by reference to the following detailed description, when considered in connection with the accompanying drawings wherein:

Fig. 3 is a cross sectional view of the novel control device taken through plane 3—3 of Fig. 2;

Fig. 4 is a plan view, partly in section, of the control device comprising the invention, and illustrating a second manner in which the device may be connected to the apparatus controlled thereby;

Fig. 5 is a sectional view of a modified form of the invention taken axially through the structure;

Fig. 6 is a transverse sectional view similar to Fig. 3 of the embodiment illustrated in Fig. 5; and Fig. 7 is a schematic diagram of a pulley arrangement illustrating the manner in which the present invention can be used to effect substantial changes in the pitch diameter ratio of a belt drive power transmission system.

Figure 1:
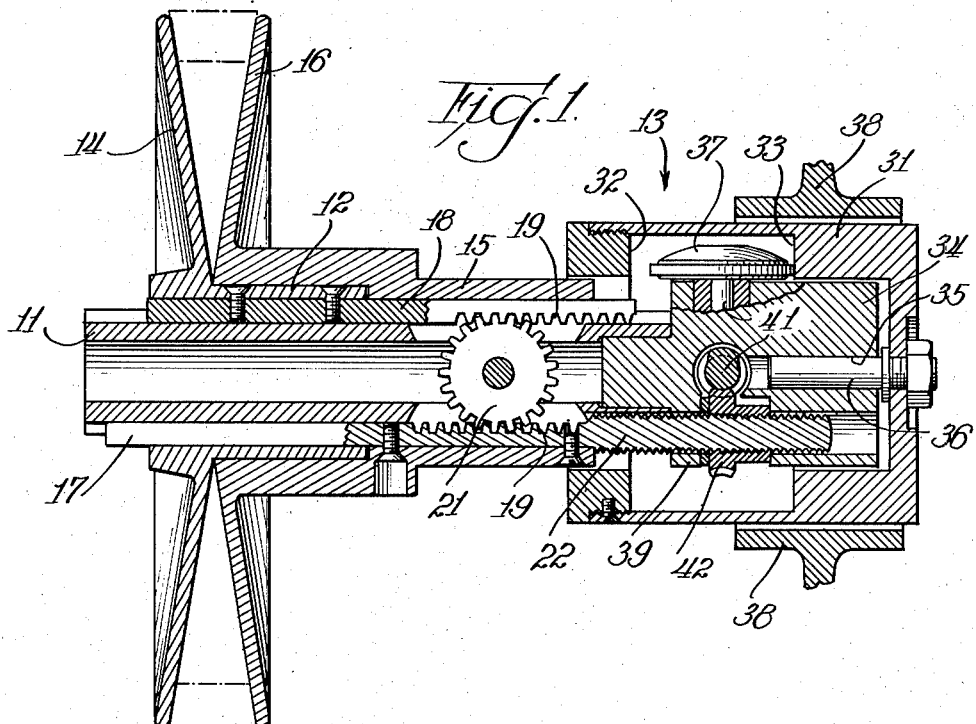
Fig. 1 is a sectional view of a combination variable pitch pulley and control device mechanism constructed in accordance with the invention, and showing the mechanism in a first one of its operative positions (it should be noted that in Figs. 1 and 2 of the drawings, the roller element is illustrated broken away from its normal position, and displaced 90°)

Referring now to Fig. 1 of the drawings more specifically, a rotatable shaft is shown at 11 which is adapted to be connected to a prime mover, not shown. Slidably supported on shaft 11 is a sleeve 12 which is secured to the rotatable shaft 11 for torque by axially extending keys seated in elongated keyways so that the sleeve 12 is axially movable with respect to shaft 11. In order to effect a change in the relative axial displacement of the shaft 11 and sleeve 12, a control device is provided which comprises a part of the present invention, and is shown broadly at 13.

In the specific arrangement disclosed in Fig. 1, the novel control device is used with a variable pitch pulley of the type disclosed in United States Letters Patent No. 2,475,954, issued to W. E. Gerbing, wherein the sleeve 12 comprises the hub of a pulley half 14, and a second sleeve or hub 15 of a cooperating pulley half 16 is slidably supported on the sleeve 12. The sleeve or hub 15 is connected to a key member 17 slidably supported in an axially extending key way formed in the shaft 11, and the sleeve or hub 12 is connected to a similar key member 18 slidably supported in a key way formed in shaft 11 diametrically opposite the key way accommodating key member 17. The key members 17 and 18 have a plurality of teeth 19 formed along the opposed surfaces thereof, and are operatively connected through a pinion gear 21 rotatably supported on the shaft 11 for transmitting axial movement therebetween. By this construction, movement of one of the key members, and therefore its respective pulley half, in one direction, causes the other key member, and therefore its respective pulley half, to move in the opposite direction. The control device 13 is operatively connected to a threaded extension 22 of one of the key members, for example, key member 17 for axially moving the same in response to a manipulation of the control device, and thereby bringing about a change in the effective pitch diameter of the pulley mechanism. While the novel control device has been illustrated in the particular arrangement disclosed, it is to be understood that the invention is not restricted to use with the specific variable pitch pulley mechanism described above, but can be adapted for use with other mechanisms of the same general nature.

With reference now to the novel control device 13, the device comprises an outer housing 31 having a pair of continuous surfaces 32, 33 formed on the inner faces of the opposite ends thereof, and transversely disposed with relation to the axis of rotation of the shaft 11. The housing 31 and therefore surfaces 32 and 33 are floatingly supported with respect to shaft 11 and sleeves 12 and 15 in that the housing may be rotated and axially moved with respect to the shaft and sleeves, but normally rotates with the shaft and sleeve in a fixed axial position because of friction. Enclosed within the housing 31 is an inner member 34 which is operatively connected to the shaft 11 for rotation therewith. The inner member 34 has a central bore in one end thereof in which a post 36 is journaled, the post 36 being secured to the end of outer housing 31, and axially movable with respect to the inner member 34 so that the outer housing 31 is floatingly supported with relation to inner member 34. Journaled on the inner member 34 is a roller element 37 which has the axis of rotation thereof transversely disposed with relation to the axis of rotation of the shaft 11, and adapted to be selectively engaged by either one of the continuous surfaces 32 and 33 formed on the inner faces of the ends of outer housing 31. (It should be noted that in Figs. 1 and 3 of the drawings, the roller element is illustrated broken away from its normal position, and displaced 90°.) The roller element 37 may comprise a rubber wheel, gear wheel, or some other similar structure whereby engagement of either of the surfaces 32 or 33 therewith causes the element to rotate, provided that the surface engaged is rotationally moving with respect to shaft 11 and therefore inner member 34. In order to bring about relative rotation between the surfaces 32 and 33 and shaft 11, a brake means such as is indicated broadly at 38 in Fig. 1, may be provided for selectively gripping and braking the outer housing 31 when it is desired to bring about a change in the relative axial displacement of shaft 11 and sleeves 12 and 15. Upon the brake means 38 being applied to the outer housing 31, and with either of the surfaces 32 or 33 engaged with the roller element 37, upon axial shifting of the housing 31 in the proper direction to contact either the surface 32 or surface 33 to bring displacement of the sleeves 12 and 15 to change the pitch of the pulley, the roller element is caused to rotate with respect to inner member 34. Rotation of the roller element 37 is then translated into a straight line movement by means hereinafter described to effect the desired relative axial movement between the shaft 11 and sleeves 12 and 15.

Referring now to Fig. 3 of the drawings, the means for translating the rotational movement of roller element 37 into a straight line movement includes a worm gear 39 formed on or otherwise secured to a rotatable shaft 41 journaled on inner member 34 and fixed to roller element 37. The worm gear 39 cooperates with a pinion gear 42 rotatably supported in inner member 34 to cause the same to rotate in a direction dependent on the direction of rotation of roller element 37. The pinion gear 42 has an internally threaded central bore 43 formed therein which accommodates the threaded extension 22 of key member 17 to cause the same to move axially in or out depending upon the direction of the rotation of pinion gear 42. By this construction, it can be appreciated that upon rotational movement being imparted to roller element 37, worm gear 39 causes the pinion gear 42 to rotate and rotation of the pinion gear 42 results in a straight line movement of the threaded extension 22 of key member 17. Because of the particular arrangement disclosed, the straight line movement is directed along the axis of shaft 11 and results in a relative axial displacement between shaft 11, sleeve 15 and therefore pulley half 16; and by reason of the interconnection through pinion 21, results in relative axial displacement between sleeve 12 and pulley half 14 with relation to shaft 11 and sleeve 15.

Referring to Fig. 4 of the drawings, the novel control device comprising the invention is shown connected to a mechanism similar to that illustrated in Fig. 1 by means other than the threaded extension of a slidably seated key member. This means comprises a threaded stud 45 having the free end thereof threadably engaged by the bore 43 of pinion 42, and having the remaining end thereof secured to the member, such as the sleeve 15, to be displaced relative to the shaft operatively connected to the inner member 34. By this construction, relative axial movement between the member to which the threaded stud 45 is secured, and the rotatable shaft on which the member is supported, may be brought about.

Figure 2:
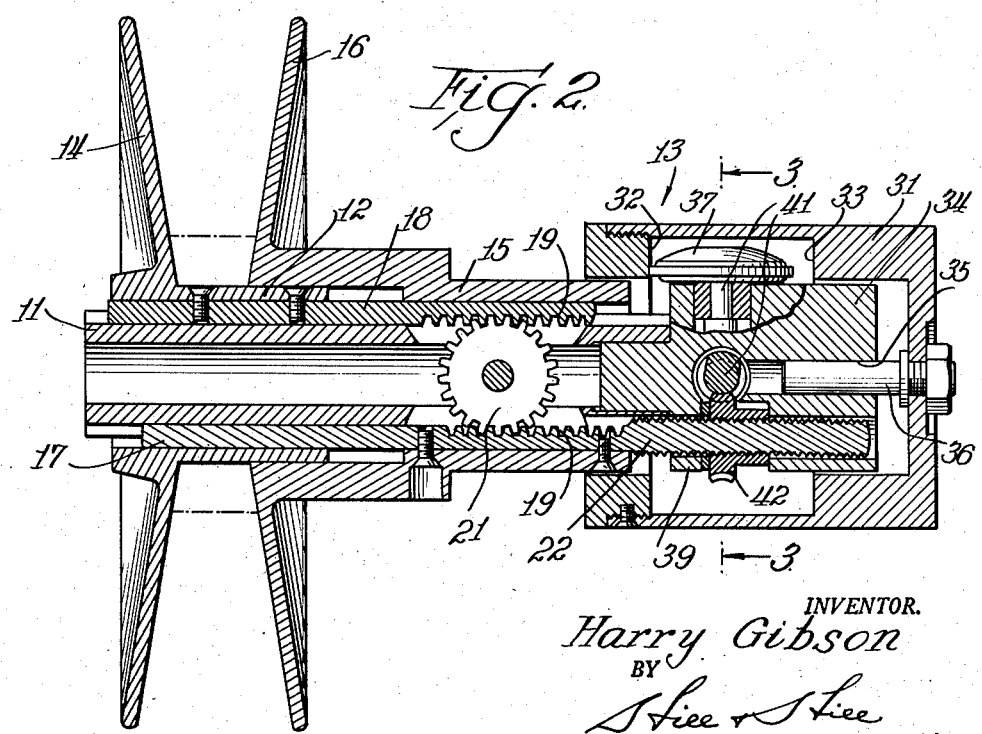
Fig. 2 is a sectional view of the mechanism illustrated in Fig. 1, showing the same in a second one of its operative positions (it should be noted that in Figs. 1 and 2 of the drawings, the roller element is illustrated broken away from its normal position, and displaced 90°)

The construction illustrated in Figs. 5 and 6 utilizes an actuating mechanism similar to that illustrated in Figs. 1, 2, and 3, of the drawings, including outer housing 31, inner member 34' corresponding to the member 34, roller element 37 and worm 39 carried by the actuating shaft 41, the roller element 37 being adapted to be rotated by engagement with either one of the surfaces 32 or 33 of the outer housing 31. However, in this construction both of the pulley halves are operatively connected to corresponding pinions 42a and 42b, with the pinion 42a engaging an axially movable threaded member 22a, and the pinion 42b operatively engaging a second axially movable threaded member 22b. The members 22a and 22b are respectively connected to the pulley halves by any suitable means, as for example, in a manner similar to that of the member 45 in the construction illustrated in Fig. 4, and in this construction the pulley halves may be keyed to the shaft 11 by any suitable means, as for example, individual keys not associated with the respective members 22a or 22b. As both pinion halves are thus controlled directly from the worm 39, the pinion 21 and the teeth 19 on the key members may be eliminated.

The operation of the structure illustrated in Figs. 5 and 6 is similar to that of the construction illustrated in Figs. 1, 2, and 3, rotation of the worm 39 in either direction, depending upon the engagement with either of the surfaces 32 or 33, resulting in rotation of the pinions 42a and 42b in opposite directions to retract or extend the respective members 22a or 22b into or from their respective pinion, thereby simultaneously moving both pulley halves toward or away from one another to effect a pitch changing movement of the pulley halves.

Referring now to Fig. 7 of the drawings, a schematic diagram of a single unit, belt-drive power transmission system is illustrated. In Fig. 7, the circle 46 represents an end view of a variable pitch pulley mechanism such as is illustrated in Figs. 1 and 2 of the drawings, and the circle 47 represents the end view of a variable pitch pulley constructed in the manner described in the above-identified Gerbing Patent No. 2,475,954, with a belt 48 entrained over the two pulleys. Assuming that the pulley 46 is the driving pulley of the arrangement, then the fastest speed of the arrangement is obtained when the belt and pulleys are in the position shown in full lines, and the slowest speed is obtained when the belt and pulleys are in the position shown in dotted lines. From the above description, it is readily apparent that the invention provides a greatly improved control means that can be utilized in single unit power transmission systems to bring about substantial changes in the pitch ratios of the pulley units incorporated in the system. This result is achieved without requiring expensive motor bases or complicated mechanical inter-connecting parts, and therefore provides a considerable savings in space and parts over previous devices of the same nature. The device is simple to operate, and provides a positive means for controlling the pitch-changing movement of a variable pitch pulley.

Obviously, other modifications and variations of the present invention are possible in the light of the above teachings. It is therefore to be understood that changes may be made herein which are within the full intended scope of the invention as defined by the appended claims.

What I claim as new and desire to secure by Letters Patent is:

1. A variable pitch pulley mechanism including in combination a rotatable shaft, a pair of opposed pulley halves including key members slidably secured to said shaft for torque and adapted to be axially moved relative to one another to bring about a change in the effective pitch of the pulley formed thereby, and a control device for controlling the effective pitch of said variable pitch pulley, said control device comprising an inner member operatively connected to said shaft for rotation therewith, an outer housing supported on said shaft and enclosing said inner member, said outer housing being adapted to be rotationally and axially moved with respect to said inner member and having continuous surfaces formed on the inner faces of the opposite ends thereof transversely disposed with relation to the axis of rotation of said shaft and inner member, a roller element journaled on said inner member and having an axis of rotation parallel to said continuous surfaces, said roller element being adapted to be selectively engaged by either of said continuous surfaces for imparting rotational movement thereto with respect to said inner member, and means for transmitting the rotational movement of said roller element to said pulley halves for changing the effective pitch thereof.

2. The combination set forth in claim 1 wherein said means for transmitting the rotational movement of said roller element comprises gear means driven by said roller element and a threaded extension operatively connected to one of said key members, said threaded extension cooperating with said gear means to effect pitch changing movement of said pulley halves.

3. The combination set forth in claim 1 wherein said means for transmitting the rotational movement of said roller element comprises a threaded extension on one of said key members, a shaft journaled on said inner member and fixed to said roller element, a worm gear fixed to said last-mentioned shaft, a pinion rotatably supported on said inner member and cooperating with said worm gear, said pinion having a threaded central bore therein cooperating with said threaded extension of one of said key members for effecting a pitch changing movement of said pulley halves.

4. The combination set forth in claim 1 wherein said means for transmitting rotational movement of said roller element comprises a threaded extension on each of said pulley halves, a shaft journaled on said inner member and fixed to said roller element, a worm gear fixed to said last-mentioned shaft, a pair of pinions rotatably disposed on opposite sides of said worm gear and cooperable therewith, each pinion having a threaded central bore, each of said threaded extensions being connected to a respective pulley half and cooperating with the threaded bore of a respective pinion for effecting a pitch changing movement of said pulley halves.

5. A variable pitch pulley mechanism including in combination a rotatable shaft, a sleeve slidably secured to said shaft for torque and adapted to be axially moved relative thereto, and a control device for controlling the relative axial displacement of said sleeve and shaft, said control device comprising an inner member operatively connected to said rotatable shaft for rotation therewith, an outer housing floatingly supported on said rotatable shaft and enclosing said inner member, said inner member having a roller element journaled thereon, said roller element being adapted to be selectively engaged by an inner surface of said outer housing for imparting rotational movement thereto, and means for transmitting movement of said roller element to said sleeve for changing the axial displacement thereof with respect to said shaft assembly.

6. A variable pitch pulley mechanism including in combination a rotatable shaft, a pair of opposed pulleys halves supported on said shaft and axially slidable relative to the latter and to each other, said shaft having a pair of opposed axially extending keyways therein, each pulley half having a key member rigidly connected thereto positioned in one of the keyways in said shaft member, said key members each having a plurality of teeth formed along their opposed surfaces, a pinion rotatably mounted on said shaft and operatively connecting said key members for transmitting axial movement in one direction of one pulley half to the remaining pulley half causing the same to move in the opposite direction, and a control device for controlling the movement of the pulley halves, said control device comprising an inner member operatively connected to said shaft for rotation therewith, an outer housing supported on said shaft and enclosing said inner member, said outer housing being adapted to be rotationally and axially moved with respect to said inner member and shaft and having continuous surfaces formed on the inner faces of the opposite ends thereof transversely disposed with relation to the axis of rotation of said shaft and inner member, a roller element journaled on said inner member and having an axis of rotation parallel to said continuous surfaces, said roller element being adapted to be selectively engaged by either of said continuous surfaces for imparting rotational movement thereto with respect to said inner member, and means for transmitting the rotational movement of said roller element to said pulley halves for changing the effective pitch thereof.

7. The combination set forth in claim 6 wherein said means for transmitting the rotational movement of said roller element comprises gear means driven by said roller element, and a threaded extension operatively mounted on one of said key members, said threaded extension cooperating with said gear means to effect a pitch changing movement of said pulley halves.

8. The combination set forth in claim 6 wherein said means for transmitting the rotational movement of said roller element comprises a threaded extension on one of said key members, a shaft journaled on said inner member and fixed to said roller element, a worm gear fixed to said last mentioned shaft, a pinion rotatably supported on said inner member and cooperating with said worm gear, said pinion having a threaded central bore therein cooperating with said threaded extension of one of said key members for effecting a pitch changing movement of said pulley halves.

9. The combination set forth in claim 6 wherein said means for transmitting rotational movement of said roller element comprises a threaded extension on each of said pulley halves, a shaft journaled on said inner member and fixed to said roller element, a worm gear fixed to said last-mentioned shaft, a pair of pinions rotatably disposed on opposite sides of said worm gear and cooperable therewith, each pinion having a threaded central bore, each of said threaded extensions being connected to a respective pulley half and cooperating with the threaded bore of a respective pinion for effecting a pitch changing movement of said pulley halves.

10. A control device for effecting a change in the relative axial displacement of a rotatable shaft and a sleeve slidably supported on said shaft, said device comprising an inner cylindrically shaped member axially mounted with respect to the shaft and operatively connected to and supported on the free end of said shaft and operatively connected to the sleeve for rotation therewith, a roller element journaled on said inner cylindrically shaped member with the axis of rotation thereof transversely disposed relative to the axis of rotation of said shaft and sleeve, an outer housing complementally formed to and journaled on the inner cylindrically shaped member and provided with a surface transversely disposed relative to the axis of rotation of said shaft and sleeve, and floatingly supported with respect to said shaft and sleeve, said surface being adapted for selective engagement with said roller element to impart rotational movement thereto relative to said member and shaft, and means for translating the rotational movement of said roller element into a straight line force to effect relative axial movement between said shaft and said sleeve.

11. A control device for effecting a change in the relative axial displacement of a rotatable shaft and a sleeve slidably supported on said shaft, said device comprising an inner cylindrically shaped member operatively connected to and supported on the free end of said shaft and operatively connected to said sleeve for rotation therewith, a roller element journaled on said inner cylindrically shaped member with the axis of rotation thereof transversely disposed relative to the axis of rotation of said shaft and sleeve, said inner cylindrically shaped member being coaxially mounted with respect to the rotatable shaft, an outer housing complementally formed to and journaled on the inner cylindrically shaped member and provided with a pair of surfaces transversely disposed relative to the axis of rotation of said shaft and sleeve, and floatingly supported with respect to said shaft and sleeve, said surfaces being disposed on opposite sides of said roller element and adapted for selective engagement with said roller element to impart rotational movement thereto relative to said member and shaft, the direction of rotation of said roller element being dependent upon the surface engaged therewith, and means for translating the rotational movement of said roller element into a straight line force to effect relative axial movement between said shaft and said sleeve, the direction in which said straight line force acts being dependent upon the direction of rotation of said roller element.

References Cited in the file of this patent

UNITED STATES PATENTS

| 1,112,345 | Philipson | Sept. 29, 1914 |
| 2,395,625 | Heyer | Feb. 26, 1946 |

FOREIGN PATENTS

| 1,148 | Great Britain | of 1908 |
| 188,920 | Germany | Sept. 30, 1907 |